United States Patent
Shie

(10) Patent No.: US 12,461,682 B2
(45) Date of Patent: Nov. 4, 2025

(54) DATA READ-WRITE SYSTEM AND METHOD THEREOF

(71) Applicant: REALTEK SEMICONDUCTOR CORP., Hsinchu (TW)

(72) Inventor: Yi-Lin Shie, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/414,986

(22) Filed: Jan. 17, 2024

(65) Prior Publication Data

US 2025/0013383 A1    Jan. 9, 2025

(30) Foreign Application Priority Data

Jul. 5, 2023 (TW) .................................. 112125147

(51) Int. Cl.
*G06F 3/06*    (2006.01)
(52) U.S. Cl.
CPC .......... *G06F 3/0656* (2013.01); *G06F 3/0604* (2013.01); *G06F 3/0659* (2013.01); *G06F 3/067* (2013.01)
(58) Field of Classification Search
None
See application file for complete search history.

(56) References Cited

U.S. PATENT DOCUMENTS

2020/0310668 A1 * 10/2020 Li ........................ G06F 3/0679

FOREIGN PATENT DOCUMENTS

CN      111752479 A * 10/2020 ........... G06F 3/0604

* cited by examiner

*Primary Examiner* — Brian R Peugh
(74) *Attorney, Agent, or Firm* — Birch, Stewart, Kolasch & Birch, LLP

(57) ABSTRACT

A data read-write system includes a receiving terminal, a buffer, a memory and a writing module. The receiving terminal is used for receiving data, and the data includes a plurality of data blocks, and each data block is arranged into a two-dimensional matrix. The buffer includes a plurality of buffer blocks. The writing module includes a twisted block deinterleaving unit, a storage unit and an output unit. The twisted block deinterleaving unit reads each data block to obtain a plurality of first block strings. The storage unit distributes and stores the data blocks in each first block string in each buffer block. The output unit is used for outputting each data block in each buffer block to the memory for storage when the occupied capacity of each buffer block reaches an upper limit of a buffer capacity.

11 Claims, 5 Drawing Sheets

DATA READ-WRITE SYSTEM AND METHOD THEREOF

CROSS-REFERENCE TO RELATED APPLICATION

This non-provisional application claims priority under 35 U.S.C. § 119(a) to patent application No. 112125147 filed in Taiwan, R.O.C. on Jul. 5, 2023, the entire contents of which are hereby incorporated by reference.

BACKGROUND

Technical Field

This case is related to a memory read related technology, and in particular to a data read-write system and a method thereof.

Related Art

ATSC 3.0 (Advanced Television Systems Committee) is the audio and video information transmission standard of a digital television, in which data has a plurality of data blocks arranged in a two-dimensional matrix. The way to read the data is to read the data block in the data in an oblique direction to obtain a block string, and the block string is then written into a memory.

However, in the process of writing the block string into the memory, only a small part of the data block of the block string is written at a time. However, in the transmission process, the block string needs to be completely transmitted once, which results in bandwidth waste of transmission.

SUMMARY

In view of the above, a data read-write system is provided. In an embodiment, the data read-write system includes a receiving terminal, a buffer, a memory and a writing module. The receiving terminal is used for receiving data, and the data includes a plurality of data blocks, and each data block is arranged into a two-dimensional matrix. The buffer includes a plurality of buffer blocks. The writing module is connected to the receiving terminal, the buffer and the memory, and the writing module includes a twisted block deinterleaving unit, a storage unit and an output unit. The twisted block deinterleaving unit reads each data block to obtain a plurality of first block strings. The storage unit distributes and stores the data blocks in each first block string in each buffer block. The output unit is used for outputting each data block in each buffer block to the memory for storage when the occupied capacity of each buffer block reaches an upper limit of a buffer capacity.

In an embodiment, the twisted block deinterleaving unit reads each data block in an oblique direction.

In an embodiment, the twisted block deinterleaving unit reads each data block in two time series to obtain each first block string and a plurality of second block strings. The storage unit distributes and stores the data blocks in each second block string in corresponding buffer blocks.

In an embodiment, the number of the buffer blocks is the sum of the number of the data blocks of the first block string and the number of the data blocks of the second block string.

In an embodiment, the two-dimensional matrix has a row number of m and a column number of n, and the number of the data blocks of the first block string is n; when reading each data block to column x, m−x+1=y and y<n, the twisted block deinterleaving unit then reads each data block in the oblique direction from row y+1 of column 1; where m and n are positive integers, and m≥n, 0<x<m, 0<y<n.

In an embodiment, the number of the buffer blocks corresponds to that of the data blocks of the first block string.

A data read-write method is additionally provided, including reading a plurality of data blocks in data to obtain a plurality of first block strings, all the data blocks being arranged into a two-dimensional matrix; distributing and storing the data blocks in each first block string in a plurality of corresponding buffer blocks in a buffer; and outputting each data block in each buffer block to a memory for storage when the occupied capacity within each buffer block reaches the upper limit of a buffer capacity.

The detailed features and advantages of this case are described in detail in the implementations below, the contents of which are sufficient to enable any person familiar with the relevant art to understand the technical content of this case and implement it accordingly. Moreover, according to the content disclosed in this specification, the scope of the patent application, and the schema, any person familiar with the related art can easily understand the purpose and advantages of this case.

DETAILED DESCRIPTION

Figure 1:
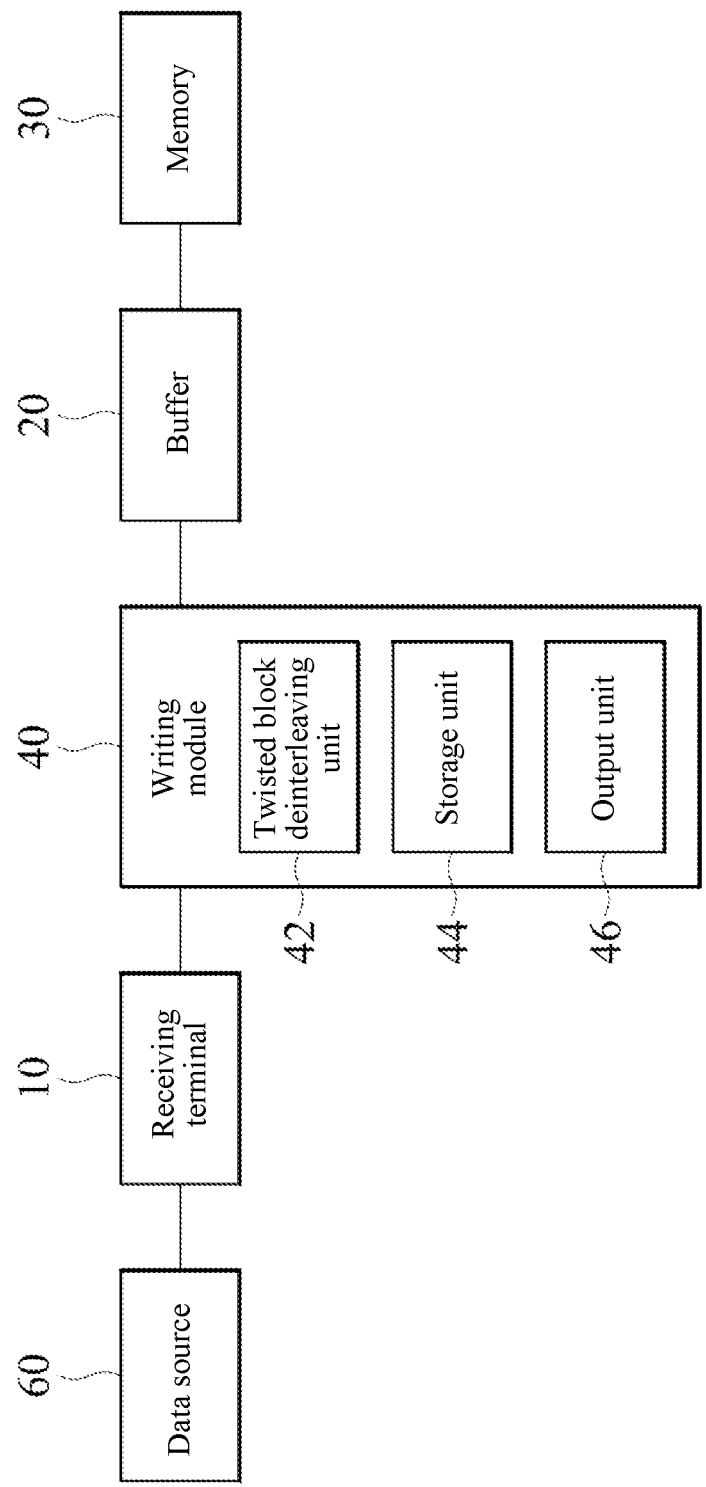
FIG. 1 illustrates a structural schematic diagram of electronic elements in an embodiment.
Figure 3:
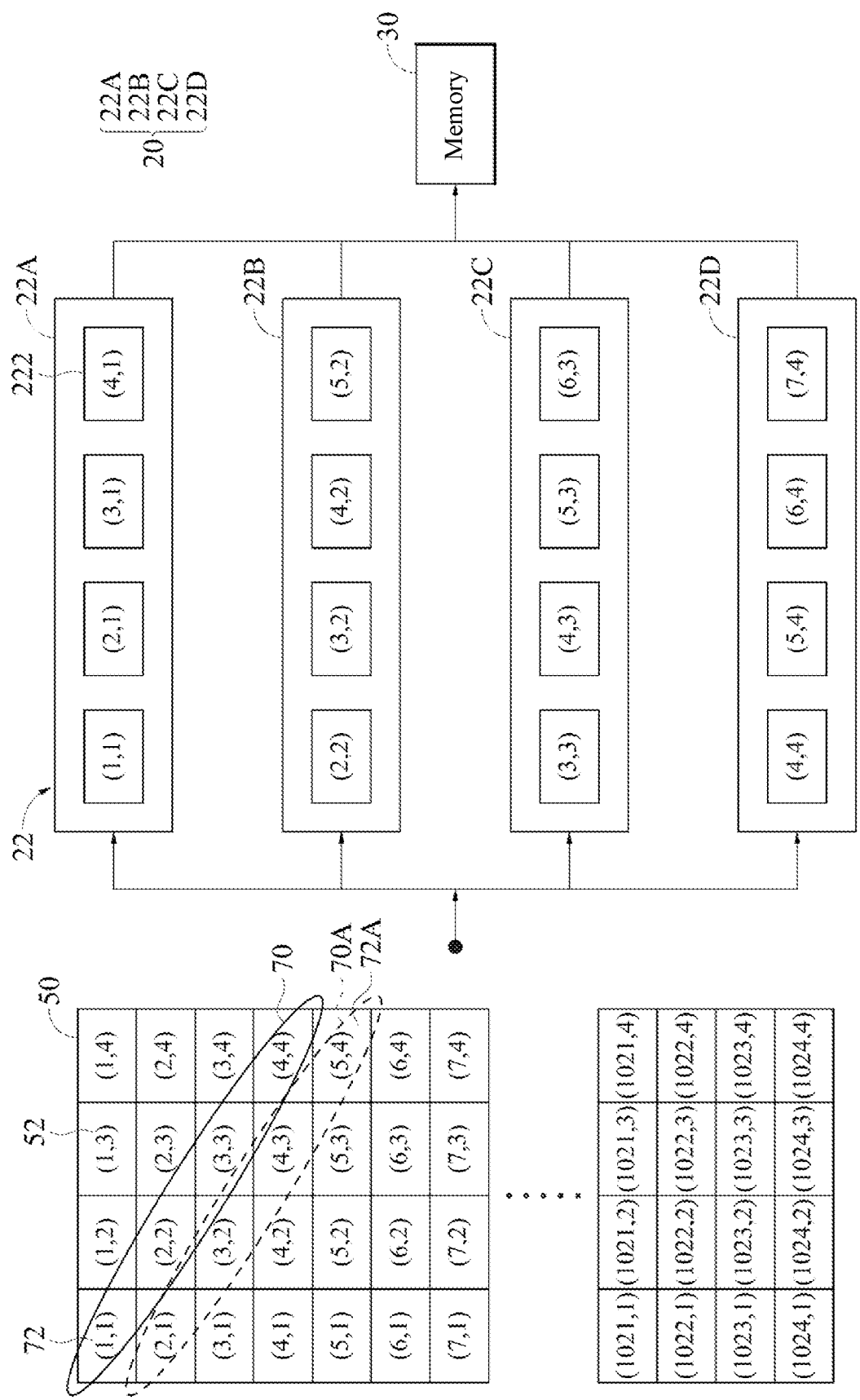
FIG. 3 illustrates a schematic diagram of reading and then storing data blocks in a buffer block in an embodiment.

Referring to FIG. 1, this case relates to a data read-write system, including a receiving terminal 10, a buffer 20, a memory 30 and a writing module 40. The receiving terminal 10 is used for receiving data 50, where the data 50 includes a plurality of data blocks 52, and all the data blocks 52 are arranged into a two-dimensional matrix (as shown in FIG. 3). In some embodiments, the data 50 is stored in a data source 60, and the receiving terminal is connected to the data source 60 through a transmission line or a printed circuit for receiving the data 50 stored in the data source 60. In some examples, the memory 30 is a double data rate synchronous dynamic random-access memory (DDR SDRAM). In some embodiments, the data source 60 is a hard disk. In some embodiments, a plurality of data blocks 52 are arranged into a two-dimensional matrix to form a data FEC block (FEC is the abbreviation for forward error correction).

Referring to FIGS. 1 and 3, the buffer 20 includes a plurality of buffer blocks 22A-D, the buffer blocks 22A-D are each used for storing the data block 52, and the buffer blocks 22A-D can each store the same number of data blocks 52. In some embodiments, the buffer blocks 22A-D can store four data blocks 52. Referring to FIG. 3, the buffer blocks 22A-D are each illustrated with an arrangement in order from top to bottom.

Figure 2:
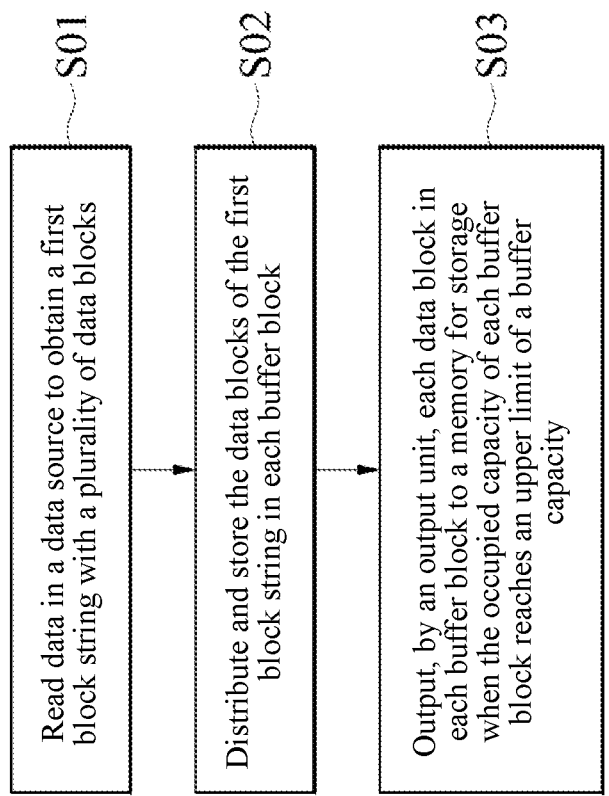
FIG. 2 illustrates a flowchart of a read-write method in an embodiment.

Referring to FIGS. 1, 2, and 3, the writing module 40 is connected to the receiving terminal 10, the buffer 20, and the memory 30. The writing module 40 includes a twisted block deinterleaving unit 42, a storage unit 44, and an output unit 46. The twisted block deinterleaving unit 42 reads each data block 52 to obtain a plurality of first block strings 70 (step S01). In some embodiments, the two-dimensional matrix is an m*n matrix, that is, the two-dimensional matrix has a column number of m and a row number of n, and the number of the data blocks 72 of the first block string 70 is the same as the row number of the two-dimensional matrix, both of which are n. The storage unit 44 distributes and stores the data blocks 72 of the first block string 70 in the buffer blocks 22A-D (step S02). In some embodiments, the storage unit 44 stores the data blocks 72 of the first block string 70 in the buffer blocks 22A-D in order from top to bottom from the head end to the tail end. If the data blocks 72 of the first block string 70 are (1, 1), (2, 2), (3, 3), and (4, 4), then (1, 1) is the head end, and (4, 4) is the tail end. When the occupied capacity of each of the buffer blocks 22A-D reaches an upper limit of a buffer capacity (i.e., when the number of the data blocks 222 stored in each of the buffer blocks 22A-D is equal to the upper limit value of the buffer capacity), the output unit 46 outputs each data block 222 in each of the buffer blocks 22A-D to the memory 30 for storage (step S03). This means that the data block 222 of the same FEC is firstly stored in the buffer 20, and when the buffer capacity reaches the upper limit, the data block 222 in the buffer 20 is then written into the memory 30. Here, for the sake of understanding, the upper limit of the buffer capacity is four, which serves as examples for illustration, but this case is not limited to this. In some embodiments, since the memory 30 has a bandwidth size of 256 bits for one read and write, and one data block 52 has a size of 32 bits, the size of the buffer 20 is a multiple of 8 (256/32). In some embodiments, the maximum row number of the two-dimensional matrix is 258, so the size of the buffer capacity is 258*256 bits.

In the process of transmitting the data 50 in the data source 60 to the memory 30 in this case, the data block 52 in the data 50 is firstly read and stored in each of the buffer blocks 22A-D in the buffer 20. Until the occupied capacity of the buffer blocks 22A-D reaches the upper limit of the buffer capacity, the data block 222 in each of the buffer blocks 22A-D is transferred once to the memory 30 for storage, in order to effectively utilize the transmission bandwidth of the memory 30, so that the reading of the data 50 is more efficient. By way of examples, one data block 52 is 32 bits, the two-dimensional matrix of the data 50 has a row number of 100 and a column number of 8100, and the unit of one read and write for the memory 30 is 256 bits. In the past, when the data 50 is written into the memory 30, every time the data block 52 is written, one read and write is performed, so when the data 50 is written into the memory 30, 810000 reads and writes (8100*100) are required. At this time, the memory 30 performs an operation of amount of information of a total of 16*1024*256 bits (unnecessary deletion), but the actual amount of information written into the memory 30 is only 16*1024*32 bits. In this embodiment, the data 50 is firstly stored in the buffer 20 before written into the memory 30, and is written into the memory 30 until the buffer capacity is full. Therefore, the memory 30 performs an operation of amount of information of a total of about 16*1024*32, which is the same as the actual amount of information written into the memory 30. Therefore, compared to previous practices, only 12.5% bandwidth ((16*1024*32)/(16*1024*256)) requires to be used in this embodiment, thus saving 87.5% bandwidth.

Figure 4:
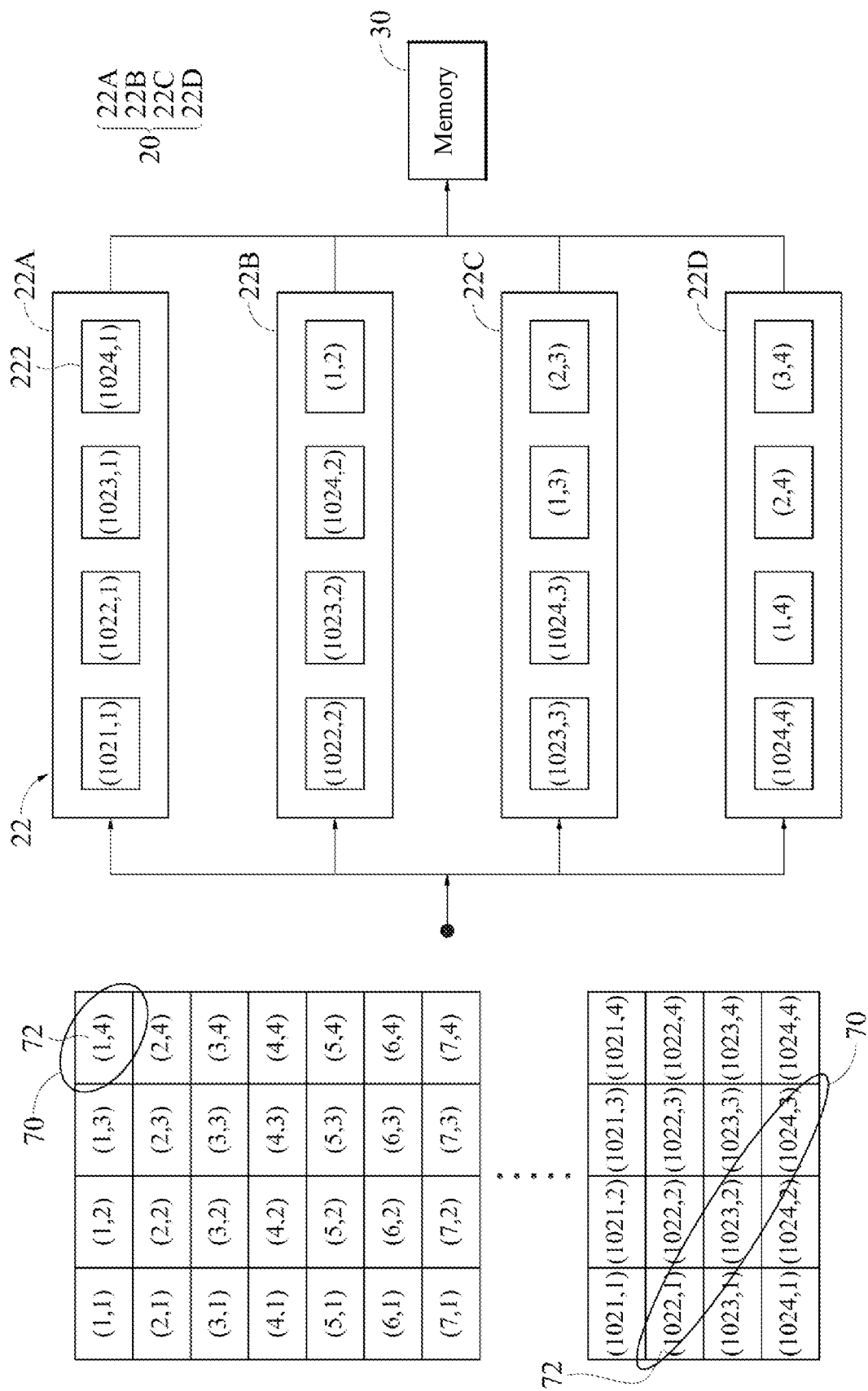
FIG. 4 illustrates a schematic diagram of reading and then storing data blocks in a buffer block in an embodiment.

Referring to FIGS. 3 and 4, it is illustrated with m=1024 and n=4 as an example. Firstly, in an embodiment, the twisted block deinterleaving unit 42 reads each data block 52 in the data 50 in an oblique direction (i.e., the embodiment of step S01). In some embodiments, the oblique direction is a direction from top left to bottom right. In addition, in the two-dimensional matrix, there are row 1, row 2, row 3 . . . , in order from left to right, and there are column 1, column 2, column 3 . . . in order from top to bottom. The twisted block deinterleaving unit 42 reads down from column 1, row 1 to obtain the plurality of first block strings 70. Since the number of the data blocks 72 of the first block string 70 is n, the first block string 70 includes four data blocks 72, namely (1, 1), (2, 2), (3, 3), and (4, 4), respectively. The storage unit 44 then stores these data blocks 72 (i.e., (1, 1), (2, 2), (3, 3), and (4, 4)) in the corresponding buffer blocks 22A-D, that is, the data block 222 stored in the buffer block 22A is (1, 1), the data block 222 stored in the buffer block 22B is (2, 2), the data block 222 stored in the buffer block 22C is (3, 3), and the data block 222 stored in the buffer block 22D is (4, 4). Next, the twisted block deinterleaving unit 42 reads data from row 1, column 2 to obtain first block strings 70A. Data blocks 72A of the first block strings 70A are (2, 1), (3, 2), (4, 3) and (5, 4), respectively. The storage unit 44 then stores these data blocks 82 (i.e., (2, 1), (3, 2), (4, 3) and (5, 4)) in the corresponding buffer blocks 22A-D, that is, the data block 222 stored in the buffer block 22A is (2, 1), the data block 222 stored in the buffer block 22B is (3, 2), the data block 222 stored in the buffer block 22C is (4, 3), and the data block 222 stored in the buffer block 22D is (5, 4). A storage method for the remaining first block strings 70 is as described above, which will not be repeated.

The twisted block deinterleaving unit 42 repeatedly reads the data 50 to obtain the plurality of first block strings 70. Then, the storage unit 44 stores the data blocks 72 of the first block strings 70 in the buffer blocks 22A-D until the occupied capacity of the buffer blocks 22A-D reaches the upper limit of the buffer capacity, that is, there are four data blocks 72 in each of the buffer blocks 22A-D. For example, the data blocks 52 in the buffer block 22A are (1, 1), (2, 1), (3, 1), and (4, 1), respectively. Moreover, the output unit 46 transmits the data blocks 222 in all the buffer blocks 22A-D to the memory 30 for storage.

In an embodiment, the number of the buffer blocks 22 is the same as that of the data blocks 72 of the first block string 70.

Referring to FIG. 4, in some embodiments, when reading down to column x, m−x+1=y and y<n, the twisted block deinterleaving unit 42 then reads the data blocks 52 in the oblique direction from row y+1 of column 1; where m and n are positive integers, and m≥n, 0<x<m, 0<y<n. Taking FIG. 4 as an example, when the twisted block deinterleaving unit 42 reads to row 1022, since 1024−1022+1=3<4, it represents that the twisted block deinterleaving unit 42 only reads three data blocks 52 (i.e., (1022, 1), (1023, 2), and (1024, 3)) and less than four data blocks 52. At this time, the twisted block deinterleaving unit 42 then reads the data blocks 52 (i.e., (1, 4)) from row 4 of column 1 (i.e., 3+1=4). At this time, the obtained data blocks 72 of the first block string 70 by the twisted block deinterleaving unit 42 are (1022, 1), (1023, 2), (1024, 3) and (1, 4). By analogy, when the twisted block deinterleaving unit 42 reads to column 1023, the obtained data blocks 72 of the first block string 70 are (1023, 1), (1024, 2), (1, 3) and (2, 4), respectively. When the twisted block deinterleaving unit 42 reads to column 1024, the data blocks 72 of the first block string 70 obtained are (1024, 1), (1, 2), (2, 3) and (3, 4).

In some embodiments, when the twisted block deinterleaving unit 42 reads through the data 50, even if the occupied capacity within the buffer blocks 22A-D has not yet reached the upper limit of the buffer capacity, the output unit 46 still transfers all the data blocks 222 in the buffer blocks 22A-D to the memory 30 for storage.

Figure 5:
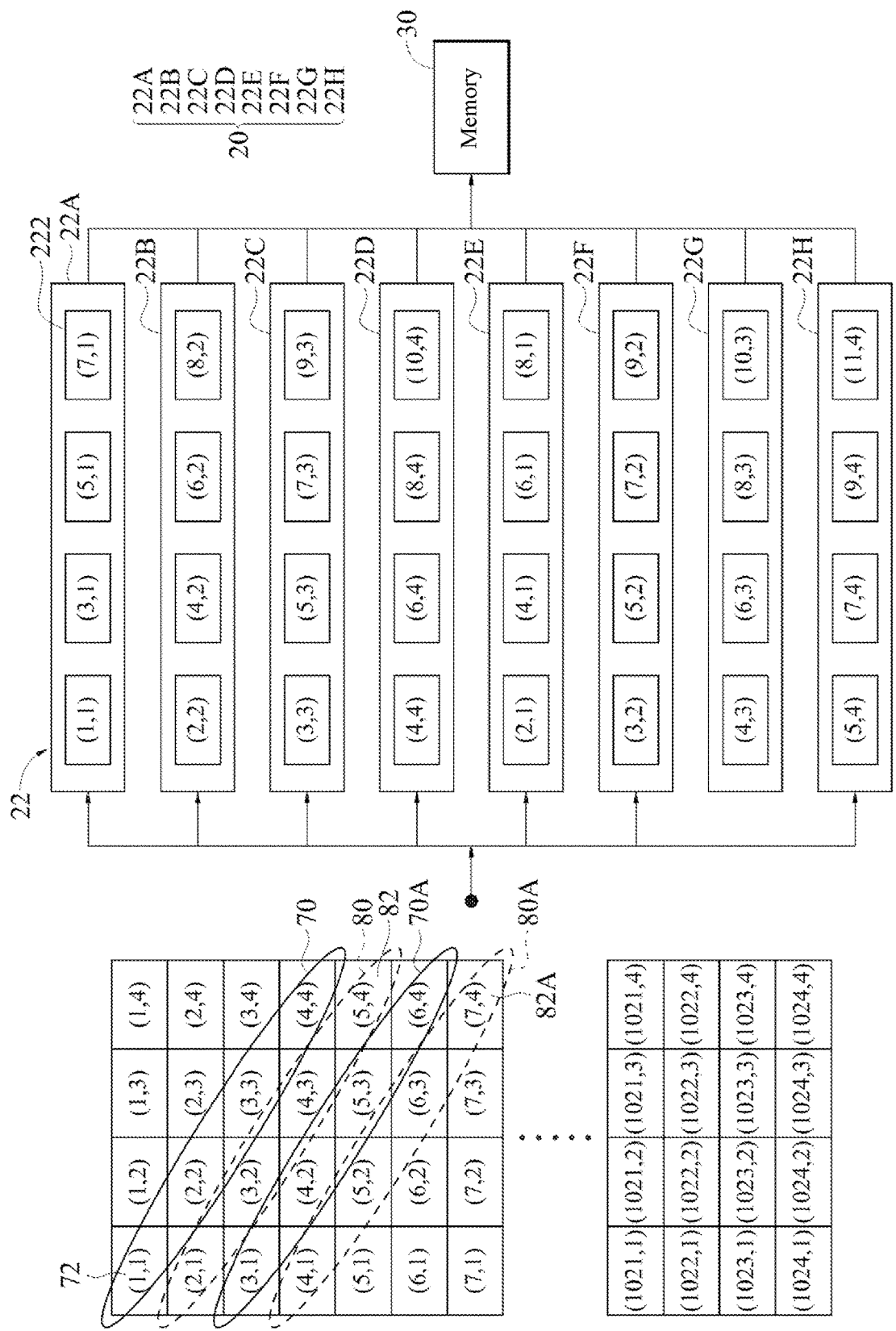
FIG. 5 illustrates a schematic diagram of reading data in a second time series and reading and then storing data blocks in a buffer block in an embodiment.

Referring to FIG. 5, in an embodiment, the twisted block deinterleaving unit 42 reads each data block 52 in the data 50 in two time series to obtain the first block strings 70 and second block strings 80. As shown in FIG. 5, the twisted block deinterleaving unit 42 reads data from row 1, column 1 in a first time series to obtain the first block strings 70. The data blocks 72 of the first block strings 70 include (1, 1), (2, 2), (3, 3), and (4, 4). The twisted block deinterleaving unit 42 reads data from row 1, column 2 in a second time series, and the obtained data blocks of the second block string 80 include (2, 1), (3, 2), (4, 3), and (5, 4). Then, the storage unit 44 stores each data block 72 of the first block string 70 in each of the buffer blocks 22A to 22D in order from the head end to the tail end. That is, the data block 222 stored in the buffer block 22A is (1, 1), the data block 222 stored in the buffer block 22B is (2, 2), the data block 222 stored in the buffer block 22C is (3, 3), and the data block 222 stored in the buffer block 22D is (4, 4). Next, the storage unit 44 stores each data block 82 of the second block string 80 in each of the buffer blocks 22E to 22H in order from the head end to the tail end. That is, the data block 222 stored in the buffer block 22E is (2, 1), the data block 222 stored in the buffer block 22F is (3, 2), the data block 222 stored in the buffer block 22G is (4, 3), and the data block 222 stored in the buffer block 22H is (5, 4).

Then, the twisted block deinterleaving unit 42 will skip to column 3, row 1 in the first time series and starts to read the data 50. The obtained data blocks 52 of the first block string 70 include (3, 1), (4, 2), (5, 3), and (6, 4). Next, the twisted block deinterleaving unit 42 skips to row 1, column 4 in the second time series to start to read the data 50, and the obtained data blocks 52 of the second block string 80A include (4, 1), (5, 2), (6, 3), (7, 4). Next, the way for the storage unit 44 to store each data block 72A of the first block string 70A and each data block 82A of the second block string 80A in each of the buffer blocks 22A to H is as described earlier, which will not be repeated. Furthermore, when the time series is three, the twisted block deinterleaving unit 42 will read the data 50 from row 1, column 1 in the first time series, reads the data 50 from row 1, column 2 in the second time series, reads the data 50 from row 1, column 3 in a third time series, and so on when the time series is four or more, which will not be repeated. In this embodiment, after read in two time series, each data block 52 in the data 50 is firstly stored into the buffer 20, and is written to the memory 30 until the buffer capacity reaches the upper limit. Therefore, compared to one time series, an additional 50% bandwidth can be saved.

In addition, in an embodiment, when the twisted block deinterleaving unit 42 reads the data 50 in two time series, the maximum row number of the two-dimensional matrix is 483, so the size of the buffer capacity is 483*256 bits.

In addition, in an embodiment, the twisted block deinterleaving unit 42 reads each data block 52 in the data 50 in two time series to obtain the first block string 70 and the second block string 80, then the number of the buffer blocks 22 in the buffer 20 is the sum of the number of the data blocks 72 of the first block string 70 and the number of the data blocks 82 of the second block string 80.

According to the data read-write system in an embodiment of the present disclosure, in the process of writing the data 50 to the memory 30, the data block 52 is firstly stored in the buffer 20. Until the data block 222 in the buffer 20 reaches the upper limit of the buffer capacity, the data block 222 in the buffer 20 is written to the memory 30, thereby saving the usage of bandwidth. In some embodiments, the above actions are repeated in two time series to write the data 50 to the memory 30, which can further save half of the bandwidth.

What is claimed is:

1. A data read-write system, comprising:
 a receiving terminal, used for receiving data, the data comprising a plurality of data blocks, the plurality of data blocks being arranged into a two-dimensional matrix;
 a buffer, the buffer comprising a plurality of buffer blocks;
 a memory; and
 a writing module, connected to the receiving terminal, the buffer and the memory, the writing module comprising a twisted block deinterleaving unit, a storage unit and an output unit, wherein the twisted block deinterleaving unit reads the plurality of data blocks to obtain a plurality of first block strings, each of the plurality of first block strings comprising a first part of the plurality of data blocks; the storage unit distributes and stores the first part of the plurality of data blocks of each of the plurality of first block strings into different ones of the plurality of buffer blocks; and the output unit outputs the first part of the plurality of data blocks of the plurality of first block strings, stored in the plurality of buffer blocks, to the memory for storage when the occupied capacity of the plurality of buffer blocks reaches an upper limit of a buffer capacity.

2. The data read-write system according to claim 1, wherein the twisted block deinterleaving unit reads the plurality of data blocks in an oblique direction.

3. The data read-write system according to claim 2, wherein the twisted block deinterleaving unit reads the plurality of data blocks in two time series to obtain the plurality of first block strings and a plurality of second block strings, each of the plurality of second block strings comprising a second part of the plurality of data blocks; and the storage unit distributes and stores the second part of the plurality of data blocks of each of the plurality of second block strings into different ones of the plurality of buffer blocks, which are different from the plurality of buffer blocks storing the first part of the plurality of data blocks of the plurality of first block strings.

4. The data read-write system according to claim 3, wherein the number of the buffer blocks in the buffer is the sum of the number of the data blocks of the first block strings and the number of the data blocks of the second block strings.

5. The data read-write system according to claim 2, wherein the two-dimensional matrix has a row number of m and a column number of n, and the number of the data blocks of the first block strings is n; when reading the plurality of data blocks to column x, m−x+1=y and y<n, the twisted block deinterleaving unit then reads the plurality of data blocks in the oblique direction from row y+1 of column 1; wherein m and n are positive integers, and m≥n, 0<x≤m, 0<y<n.

6. The data read-write system according to claim 1, wherein the number of the buffer blocks in the buffer corresponds to that of the data blocks of the first block strings.

7. A data read-write method, comprising:
reading a plurality of data blocks from data to obtain a plurality of first block strings, each of the plurality of first block strings comprising a first part of the plurality of data blocks, all the data blocks being arranged into a two-dimensional matrix, wherein the data blocks are read in an oblique direction;
distributing and storing the first part of the plurality of data blocks of each of the plurality of first block strings into different ones of a plurality of buffer blocks in a buffer; and
outputting the first part of the plurality of data blocks of the plurality of first block strings, stored in the plurality of buffer blocks, to a memory for storage when the occupied capacity within the plurality of buffer blocks reaches the upper limit of a buffer capacity.

8. The data read-write method according to claim 7, wherein the plurality of data blocks are read in two time series to obtain the plurality of first block strings and a plurality of second block strings, each of the plurality of second block strings comprising a second part of the plurality of data blocks, and the second part of the plurality of data blocks of each of the plurality of second block strings is distributed and stored into different ones of the corresponding buffer block, which are different from the plurality of buffer blocks storing the first part of the plurality of data blocks of the plurality of first block strings.

9. The data read-write method according to claim 8, the number of the buffer blocks in the buffer is the sum of the number of the data blocks of the first block strings and the number of the data blocks of the second block strings.

10. The data read-write method according to claim 7, wherein the two-dimensional matrix has a column number of m and a row number of n, and the number of the plurality of data blocks of the first block strings is n; when read to column x, and $m-x+1=y$, $y<m$, the plurality of data blocks are then read from row $y+1$ of column 1 in the oblique direction; wherein m and n are positive integers, and $n \geq n$, $0<x<n$, $0<y<m$.

11. The data read-write method according to claim 7, wherein the number of the buffer blocks in the buffer corresponds to that of the data blocks of the first block strings.

* * * * *